(12) United States Patent
Sato et al.

(10) Patent No.: US 6,473,378 B2
(45) Date of Patent: Oct. 29, 2002

(54) OPTICAL RECORDING APPARATUS

(75) Inventors: Mitsuru Sato, Tsurugahsima (JP); Takanori Maeda, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 65 days.

(21) Appl. No.: 09/728,058

(22) Filed: Dec. 4, 2000

(65) Prior Publication Data

US 2001/0043531 A1 Nov. 22, 2001

(30) Foreign Application Priority Data

Dec. 2, 1999 (JP) .......................................... 11-343803

(51) Int. Cl.⁷ ................................................. G11B 3/90
(52) U.S. Cl. ............................... 369/53.14; 369/59.12; 369/59.15
(58) Field of Search ........................... 369/44.32, 44.33, 369/47.14, 47.15, 47.25, 47.28, 47.51, 53.12, 53.13, 53.19, 53.2, 53.22, 53.31, 53.34, 53.36, 53.14, 59.12, 59.15

(56) References Cited

U.S. PATENT DOCUMENTS 5,848,045 A * 12/1998 Kirino et al. ................ 369/116
6,320,699 B1 * 11/2001 Maeda et al. ............. 369/44.32

* cited by examiner

Primary Examiner—Paul W. Huber
(74) Attorney, Agent, or Firm—Sughrue Mion, PLLC (57) ABSTRACT

An optical recording apparatus for writing information on an optical recording medium in which a recording surface is covered with a transparent layer. The information to be written on the optical recording medium is converted into a pulse signal, and spherical aberration occurring due to an error of a thickness of the transparent layer is detected, the pulse signal being controlled in accordance with the detected spherical aberration.

6 Claims, 8 Drawing Sheets

OPTICAL RECORDING APPARATUS

BACKGROUND OF THE INVENTION

1. Field of the Invention

The present invention relates to an optical recording apparatus for recording information on an optical recording medium in which a recording surface is covered with a transparent layer.

2. Description of the Related Art

As one of techniques for properly recording marks indicative of information on a recordable optical disk, Strategy recording is known. A concrete example of the Strategy recording is shown in FIGS. 1, 2 and 3.

Figure 1:
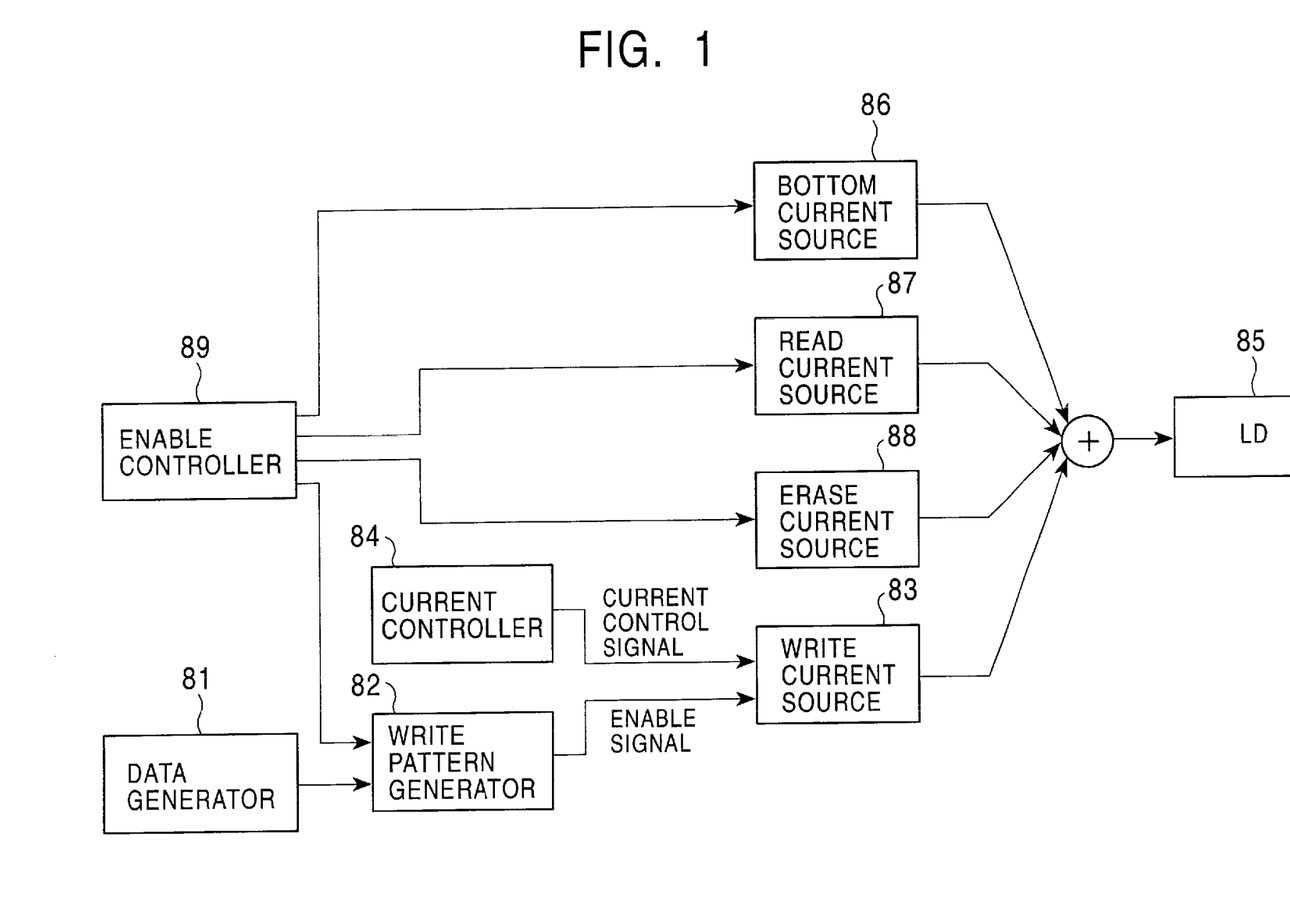
FIG. 1 is a block diagram showing a construction of a conventional optical recording apparatus.
Figure 2:
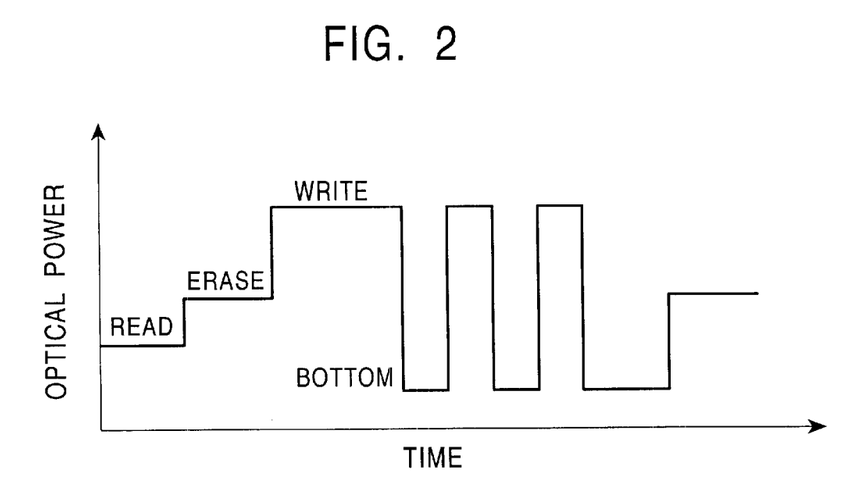
FIG. 2 is a timing chart showing the characteristics of four-step controlling of LD power in the conventional optical apparatus.
Figure 3:
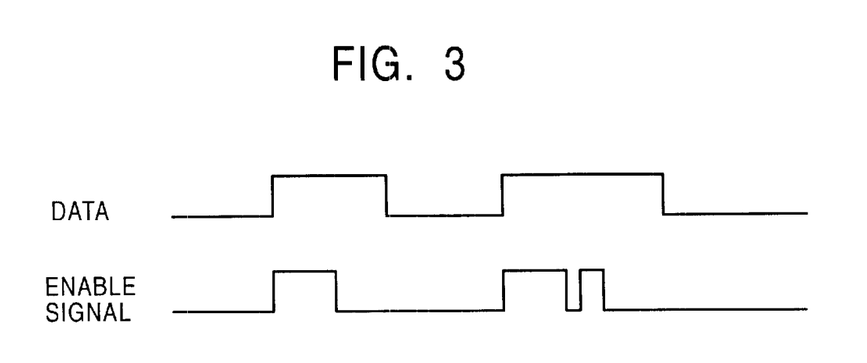
FIG. 3. is a timing chart showing the relation between data and an enable signal in a conventional Strategy recording technique.

FIG. 1 is a block diagram showing a schematic construction of a conventional optical recording apparatus using the Strategy recording, FIG. 2 is a timing chart showing the characteristics of four-step controlling of LD power, in which the optical power of a laser beam issued from a laser diode (LD) 85 shown in FIG. 1 and time are assigned on the vertical and lateral axes respectively, and FIG. 3 is a drawing showing an example of the relation indicated on time axes between data and an enable signal concerning the Strategy recording.

As is clear from FIGS. 1 to 3, the Strategy recording is the technique for ON/OFF controlling four current sources, which include a bottom current source 86, a read current source 87, an erase current source 88 and a write current source 83, through a controller 89, and controlling heat added to a recording layer of an optical disk by pulse-modulating the power of a laser beam output from the laser diode 85 during a recording operation onto the optical disk in order to form a proper mark on the optical disk.

Referring to the drawings, a data generator 81 is used to generate data to be recorded, a write pattern generator 82 is used to generate a write pattern, which is to be recorded as a mark on an optical disk, from the generated data, and a current controller 84 sets a current control value for the write current source 83 and supplies the set value to the write current source 83.

The enable control referred to above used for the ON/OFF controlling of the current sources, and the enable signal is a signal supplied to the LD 85 for carrying out an enable control operation.

An optical disk is generally covered with a transparent layer which prevents a recording layer from suffering any hurt or collision with a head, to maintain reading or writing. The transparent layer is formed by, for example, injection molding. Since it is difficult to accurately make the transparent layer to a desired thickness with respect to the whole surface thereof, a thickness error of several ten $\mu$m occurs usually.

In order to prevent a problem by reading or writing even when the thickness error occurs, the techniques for recording information on an optical disk with a diameter of a spot thereon reduced by increasing a numerical aperture of an objective lens have heretofore been studied. In these techniques, the correcting of spherical aberration occurring due to a thickness error of a transparent layer is done. In the spherical aberration operation, for example, a degree of modulation of a reproduction signal from an optic al disk, the jitters thereof and an error rate are monitored, and a lens is driven in accordance with the content of the results of the monitoring operation.

However, when the recording of information is done on an unrecorded disk, a reproduction signal is not obtained, so that the spherical aberration cannot be compensated by a method similar to that described above. Therefore, a well-regulated mark becomes unable to be formed due to the influence of the spherical aberration to cause the recording and reproducing characteristics to be deteriorated as known well. In order to attain high-density recording on an optical disk, increasing NA (Numerical Aperture) is required as referred to above. In the case, the spherical aberration due to the influence of an error of a thickness of the transparent layer becomes a problem, so that making compensation for aberration becomes necessary.

SUMMARY OF THE INVENTION

The present invention has been made in view of the above-described problems, and provides an optical recording apparatus capable of detecting the spherical aberration, which occurs due to an error of a thickness of a transparent layer of a recording medium, even when an optical system having an objective lens of a high numerical aperture is employed, and irrespective of whether the recording medium in use is a recorded medium or an unrecorded medium; making compensation for the spherical aberration by controlling on the basis of the detected information a pulse width or amplitude of recording data with respect to the optical recording medium; and thereby lessening the deterioration due to the spherical aberration of the writing characteristics and attaining excellent recording and reproducing characteristics.

According to an aspect of the present invention, the optical recording apparatus is adapted to write information on an optical recording medium in which a recording surface is covered with a transparent layer, and comprises: means for converting recording information to be written on the optical recording medium into a pulse signal, detecting means for detecting spherical aberration occurring due to an error of a thickness of the transparent layer, and control means for controlling the pulse signal on the basis of the detected spherical aberration.

By using the above construction, when a laser recording waveform is controlled with respect to the optical recording medium by the control device on the basis of the information on the spherical aberration detected by the detecting means, the spherical aberration occurring due to an error of a thickness of the transparent layer can be corrected without obtaining a reproduction signal, and excellent recording and reproducing characteristics can be attained. Especially, the spherical aberration increases and a noticeable effect can be obtained when the NA is high, so that the present invention is effectively used for a densified optical disk.

The control means includes converting means for converting a relative value of spherical aberration obtained through the detecting means into an absolute value thereof, and generating means for generating a spherical aberration compensation value so that either one or both of the width and amplitude of the pulse signal are changed on the basis of the absolute value.

By using this arrangement, the deterioration of the writing characteristics due to spherical aberration can be reduced and excellent recording and reproducing characteristics can be realized by changing either one or both of a pulse width and amplitude of the recording data with respect to the optical recording medium on the basis of an absolute value of detected information of the spherical aberration which is outputted from the generating means through the converting means.

According to another aspect of the present invention, the optical recording apparatus is adapted to record a write pattern by pulse-modulating laser power, which is used during a recording operation, in the direction of a time axis by controlling the write current source, and the generating means controls a pulse width of the write pattern control signal by inserting a delay circuit between write pattern generating means which generates the write pattern and the write current source, the delay circuit changing the pulse width of the pulse signal by a delay period corresponding to the absolute value of the detected spherical aberration.

The generating means sets a delay period for the delay circuit to the highest level of time within a range of delay which the apparatus allows, when spherical aberration of a zero level is detected by the detecting means.

By using the arrangement, spherical aberration occurring due to an error of a thickness of a transparent layer can be corrected by changing an edge shifting value in accordance with a spherical aberration error by utilizing a phenomenon of the recording power working in the direction in which it decreases due to the influence of the spherical aberration when the spherical aberration increases, and setting long a pulse for the application of write power. This enables excellent recording and reproducing characteristics to be attained.

According to still another aspect of the present invention, the optical recording apparatus is adapted to record a write pattern by pulse-modulating laser power, which is used during a recording operation, in the direction of a time axis by controlling the write current source, and the generating means uses a variable gain amplifier which determines gain by a control voltage, for a current controller for determining a current control level of controlling a current supplied to the write current source, and controls a gain control voltage of the variable gain amplifier in accordance with the absolute value of spherical aberration to control the current control level.

By using this arrangement, a level of controlling a current supplied to the write current source is obtained by controlling a voltage for controlling the variable gain amplifier by a spherical aberration value, and this enables the spherical aberration occurring due to an error of a thickness of the transparent layer to be corrected by changing an amplitude of a pulse supplied to the write current source, and excellent recording and reproducing characteristics to be attained.

According to a further aspect of the present invention, the optical recording apparatus is adapted to record a write pattern by pulse-modulating laser power, which is used during a recording operation, in the direction of a time axis by controlling a write current source, and the generating means uses an addition circuit for a current controller for determining a current control level of controlling a current supplied to the write current source, and determines the current control level by adding an absolute value corresponding to spherical aberration to a fixed value.

By using this arrangement, a level of controlling a current supplied to the write current source is obtained by adding a value corresponding to a spherical aberration to a fixed value, and this enables the spherical aberration occurring due to an error of a thickness of the transparent layer to be corrected by changing an amplitude of a pulse supplied to a pulse current source, and excellent recording and reproducing characteristics to be attained.

DESCRIPTION OF THE PREFERRED EMBODIMENTS

An embodiment of the present invention will now be described in detail with reference to the drawings.

Figure 4:
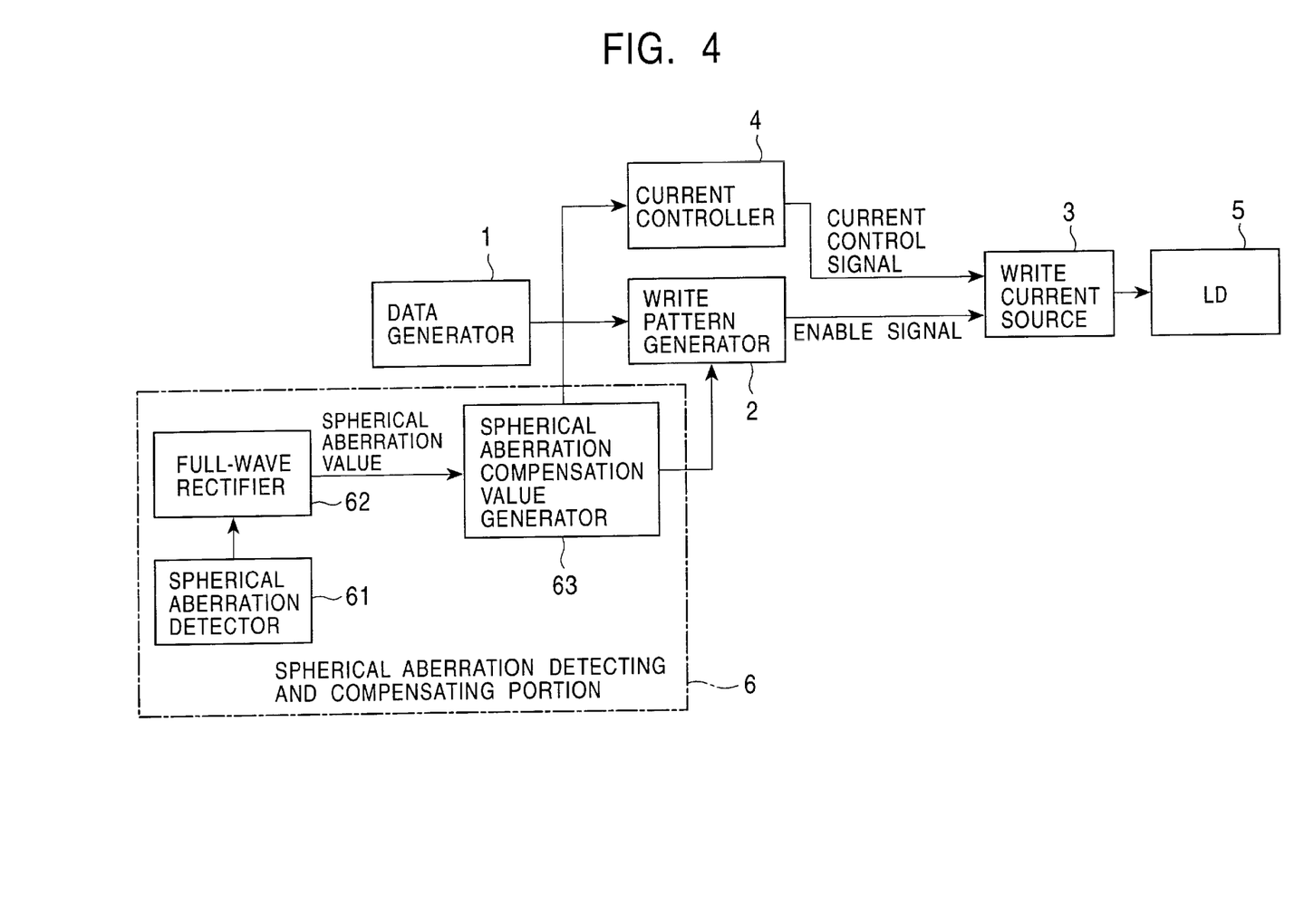
FIG. 4 is a block diagram showing an embodiment of the present invention.

FIG. 4 is a block diagram showing an optical recording apparatus to which the present invention is applied. Referring to the drawing, a data generator 1 generates recording data, which are supplied to a write pattern generator 2. The write pattern generator 2 generates a write pattern signal in accordance with the recording data. The write pattern generator 2 has a predetermined delay time for generating the write pattern signal. The write pattern generator 2 also generates a gate signal having a predetermined width immediately before generating the write pattern signal. The gate signal is supplied to a spherical aberration detecting and compensating portion 6. A write current source 3 outputs a current for controlling optical power of a laser diode 5 in accordance with a current control signal supplied from a current controller 4 and an enable signal supplied from the spherical aberration detecting and compensating portion 6, and supplies the output current to the laser diode 5.

The spherical aberration detecting and compensating portion 6 newly added by the present invention includes a spherical aberration detector 61, a full-wave rectifier 62 and a compensation value generator 63 for the spherical aberration. The spherical aberration detector 61 detects first reflected light of reflected light obtained through an object lens from a recording surface of an optical disk. The first reflected light corresponds to first irradiation light irradiated to the recording surface via only a portion which has a first predetermined numerical aperture, which is equal to or smaller than a third predetermined numerical aperture, in an optical system including the object lens. The spherical aberration detector 61 also detects second reflected light of the reflected light obtained through the object lens from the recording surface of the optical disk. The second reflected light corresponds to second irradiation light irradiated to the recording surface via only a portion which has a second predetermined numerical aperture, which is larger than the third predetermined numerical aperture, in the optical system. The spherical aberration detector 61 issues a first error signal indicative of the amount of defocus of the first irradiation light on the recording surface, issues a second error signal indicative of the amount of defocus of the second irradiation light on the recording surface, and issues a signal which corresponds to spherical aberration occurring due to an error of the thickness of a transparent layer, by using at least one of the first and second error signals. A detailed construction of an inner portion of this spherical aberration detector 61 is disclosed in Japanese Patent Application No. 358392/1998 filed on Dec. 15, 1998 by the same applicant.

The output signal indicative of the spherical aberration detected by the spherical aberration detector 61 is expressed by a positive or negative value and supplied to the full-wave rectifier 62. The full-wave rectifier 62 converts the output signal indicative of the spherical aberration into an absolute value and supplies the resultant value to the spherical aberration compensation value generator 63. The generator 63 generates a spherical aberration compensation value by a method to be described later, in accordance with an absolute value of spherical aberration obtained through the full-wave rectifier 62, and supplies the resultant compensation value to the write pattern generator 2 to control an enable signal, or to the current controller 4 to control a current control value.

Figure 5:
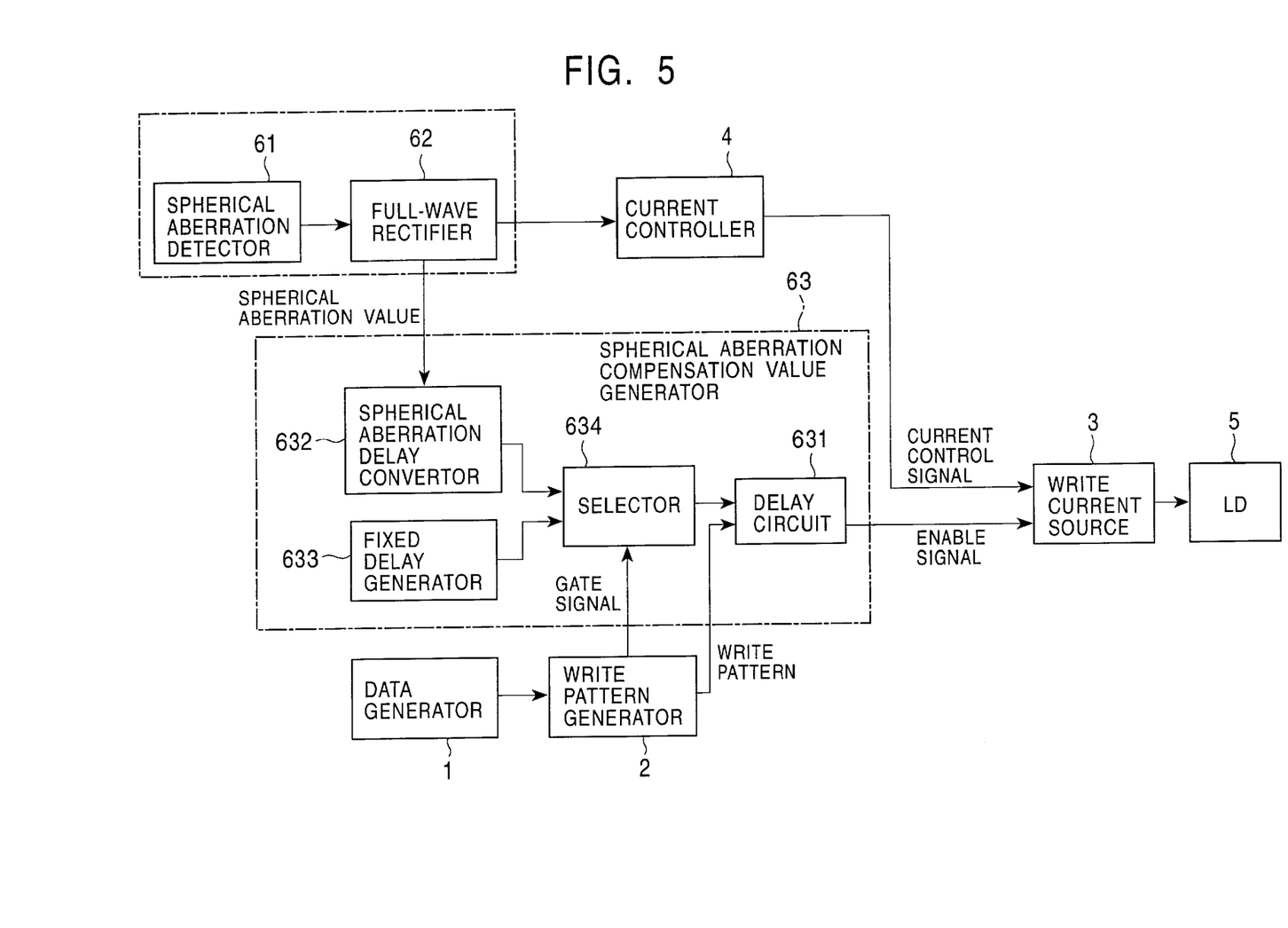
FIG. 5 is a block diagram showing a concrete construction of a spherical aberration compensation value generator shown in FIG. 4.

FIG. 5 is a block diagram showing an example of the construction of the spherical aberration compensation value generator 63 shown in FIG. 4. Referring to FIG. 5, blocks designated by the same reference numerals as used in FIG. 4 represent the same parts. In this embodiment, the spherical aberration compensation value generator 63 includes a delay circuit 631, a spherical aberration-delay convertor 632, a fixed delay generator 633 and a selector 634. The delay circuit 631 is provided between the write pattern generator 2 and the write current source 3, and a delay period of the delay circuit 631 is determined on the basis of a value output from a spherical aberration detecting and compensating portion 6. The spherical aberration-delay convertor 632 supplies a delay period to the selector 634. The delay period corresponds to an absolute value supplied from the full-wave rectifier 62. The fixed delay generator 633 generates a signal indicative of a fixed delay period. The selector 634 selectively outputs either one of the delay period by the spherical aberration-delay convertor 632 and fixed delay period by the fixed delay generator 633 to the delay circuit 631, in accordance with agate signal supplied from the write pattern generator 2. The delay circuit 631 delays a write pattern supplied from the write pattern generator 2 by a delay period output from the selector 634.

Figure 6:
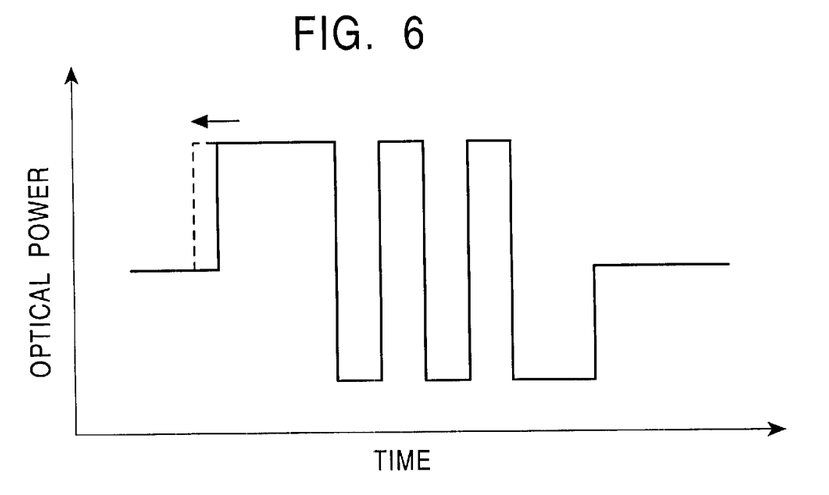
FIG. 6 is a timing chart showing a basic principle of the correction of spherical aberration by edge shifting.

The operation of the spherical aberration compensation value generator 63 shown in FIG. 5 will now be described in detail with reference to FIGS. 6 and 7.

Figure 7:
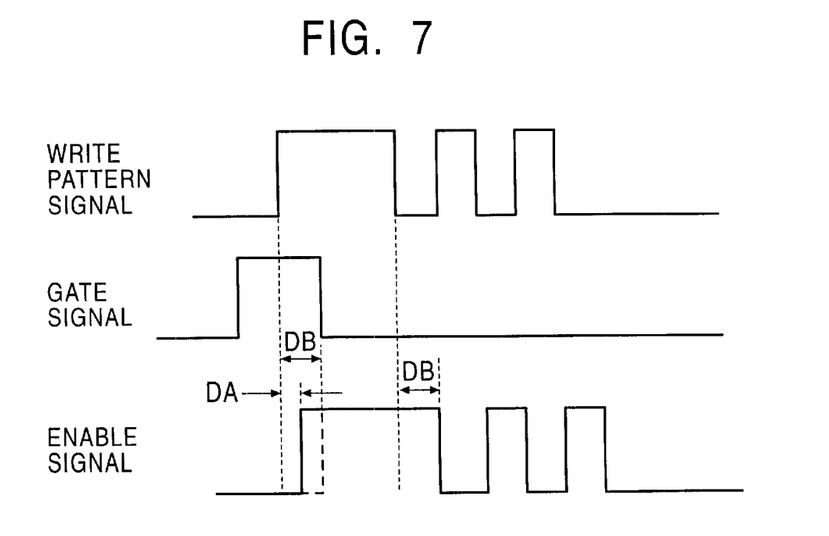
FIG. 7 is a timing chart showing an operation of the spherical aberration compensation value generator.

When recording data supplied to the write pattern generator 2 indicates a predetermined length (for example, 8T, T is a length per bit), a write pattern signal generated in the write pattern generator 2 has a plurality of pulses (for example, 3T, 1T and 1T), as shown in FIG. 7. The write pattern generator starts generating a gate signal of a high level immediately before generating the first pulse of the write pattern signal, as shown in FIG. 7. The write pattern generator stops generating the gate signal when the fixed delay period has been lapsed after generating the first pulse of the write pattern signal, as shown in FIG. 7. When the gate signal is supplied to the selector 634, the selector 634 supplies to the delay circuit 631 with a delay period output from the spherical aberration-delay convertor 632. Thus, an enable signal is generated by delaying the first pulse of the write pattern signal by the output delay period DA, as shown in FIG. 7. When the generation of the gate signal is stopped, the selector 634 supplies to the delay circuit 631 with the fixed delay period output from the fixed delay generator 633.

After that, the enable signal is generated by delaying each of the pulses of the write pattern signal by the fixed delay period DB as shown in FIG. 7.

As described above, a delay period of the delay circuit 631 is determined in accordance with an absolute value obtained by the spherical aberration detector 61. Since the results of detection output from the spherical aberration detector 61 are shown by a relative value of a positive or negative value, an value obtained by full-wave rectifying an detected output of the spherical aberration detector 61 is used as an absolute value of a spherical aberration value. The absolute value is supplied to the spherical aberration-delay convertor 632. In the spherical aberration-delay convertor 632, the delay period is set so that, when the absolute value becomes large, the delay period during which a laser diode 5 emits a laser beam by the write current becomes long. The delay period output from the spherical aberration-delay convertor 632 is supplied to the delay circuit 631 through the selector 634 while,the write pattern generator 2 is generating the gate signal.

When spherical aberration increases, the optical power of the laser beam receives influence in the recording power decreasing direction by the increased aberration. Therefore, the write current source 3 is controlled by changing the amount of front edge shifting of the enable signal corresponding to a spherical aberration error and thereby widely setting the first pulse of the enable signal as shown in FIG. 7. When an error for the spherical aberration is not detected, i.e., when the level of the spherical aberration is zero, a delay period shall be set to the longest time within an allowable range. The longest time is equal to the fixed delay period given by the fixed delay generator 633.

Figure 8:
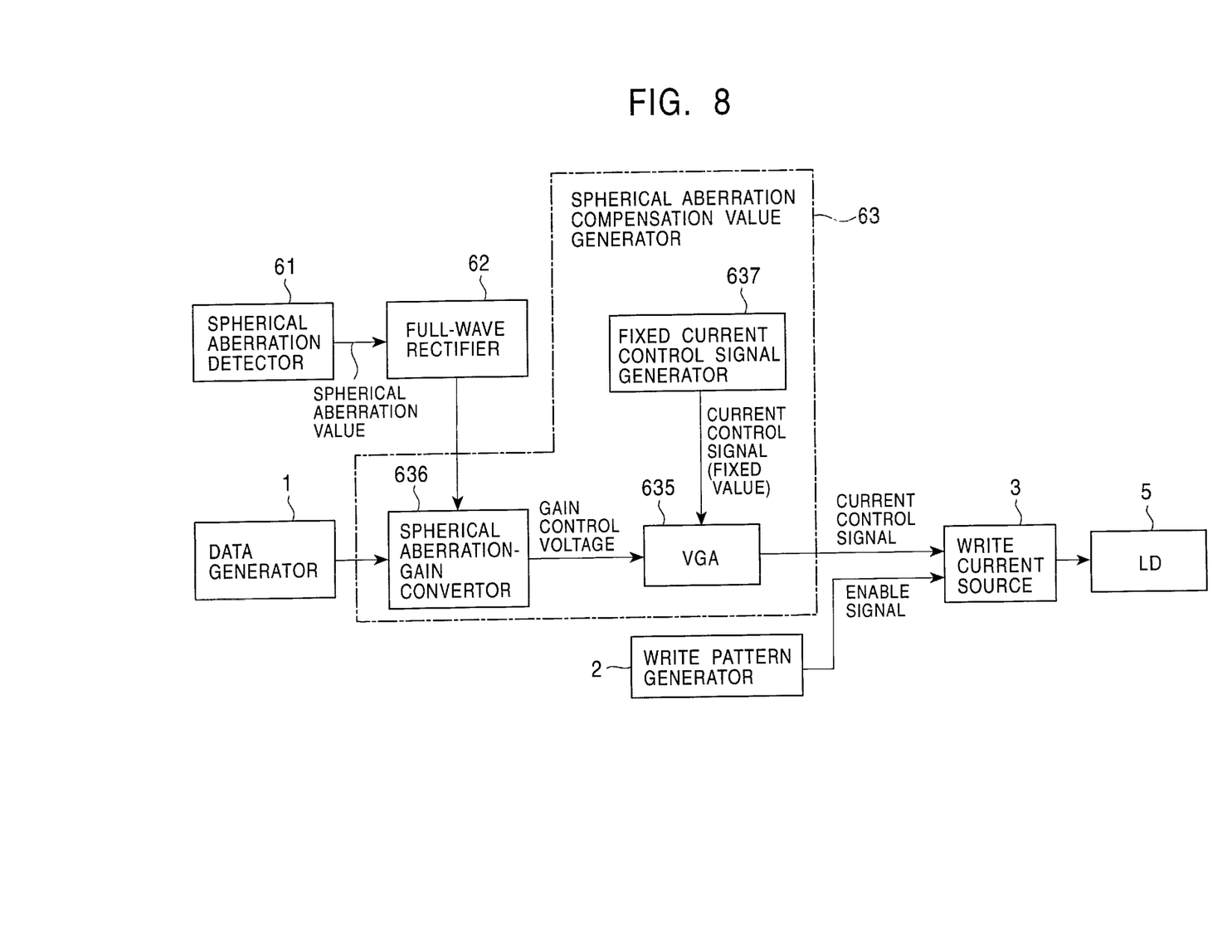
FIG. 8 is a block diagram showing another example of the construction of the spherical aberration compensation value generator shown in FIG. 4.
Figure 9:
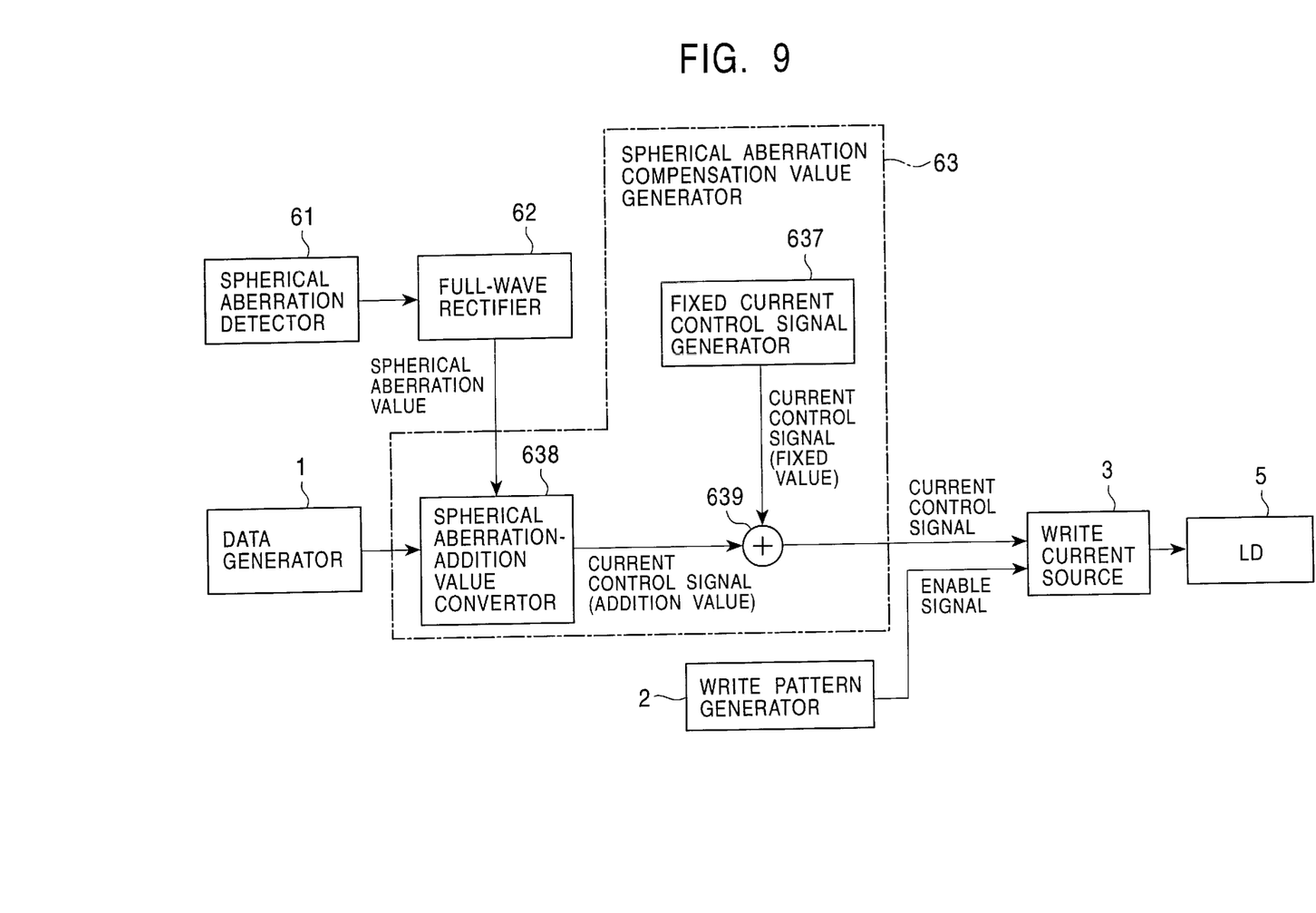
FIG. 9 is a block diagram showing still another example of the construction of the spherical aberration compensation value generator shown in FIG. 4.

FIGS. 8 and 9 are block diagrams showing other examples of the spherical aberration compensation value generator 63 shown in FIG. 5, and both of these examples constitute devices for correcting spherical aberration by a level shifting operation.

In a spherical aberration compensation value generator 63, a VGA (Voltage Gain Amplifier) 635 shown in FIG. 8 is used as a current controller 4. The VGA 635 is a variable gain amplifier capable of determining gain by a control voltage. The VGA 635 is formed so as to obtain a fixed current value generated by a fixed current control rate generator 637, and control a gain control voltage of the VGA 635 by gain outputted from a spherical aberration-gain convertor 636.

The spherical aberration-gain convertor 636 generates a gain control voltage for controlling the VGA 635 in accordance with a spherical aberration value obtained through a full-wave rectifier 62. As a result, a current control signal given to a write current source 3 is controlled.

Figure 10:
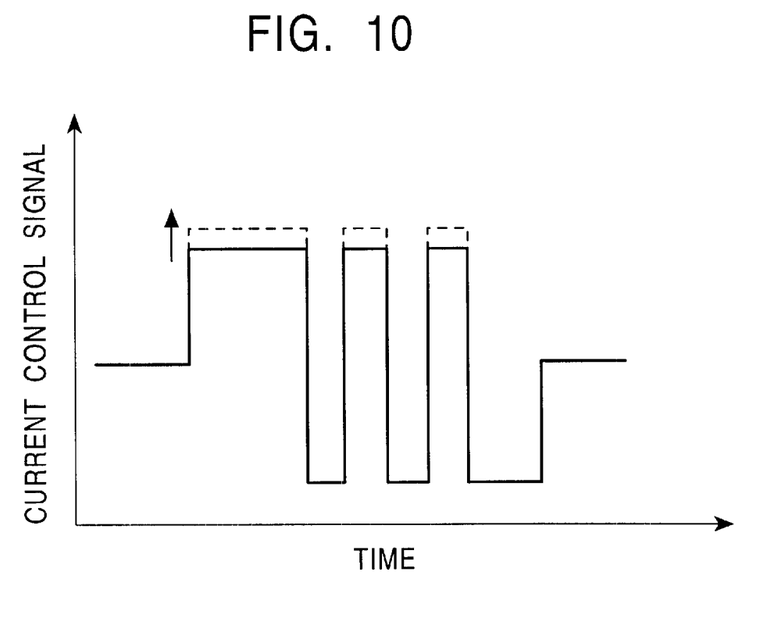
FIG. 10 is a timing chart showing a basic principle of the correction of spherical aberration by level shifting.

FIG. 10 shows a basic principle of the correction of spherical aberration based on a level shifting operation with a current control signal and time graduated on a vertical axis and lateral. axis respectively. The correcting of spherical aberration can be done by shifting a rate (an output from the VGA 635 and that from an addition circuit 639 described later) of controlling a current supplied to the write current source 3 to a level shown by broken lines in the drawing. In the example shown concretely in FIG. 8, the spherical aberration-gain convertor 636 sets high a gain control voltage of the VGA 635 so that, when an absolute value of spherical aberration becomes large, the optical power works greatly by the influence of the spherical aberration, and thereby increases a level of a rate of controlling a current supplied to the write current source 3.

In the spherical aberration compensation value generator 63 shown in FIG. 9, an addition circuit 639 is used as a current controller 4. An output from a fixed current control signal generator 637 and that from a spherical aberration-addition value convertor 638 are supplied to the addition circuit 639. The addition circuit 639 sums up a fixed value supplied by the fixed current control signal generator 637 and an value corresponding to the spherical aberration supplied by the spherical aberration-addition value convertor 638 to generate a current control signal, and supplies the current control signal to the write current source 3. By using this arrangement, the mode of embodiment shown in FIG. 9 also enables the spherical aberration compensation based on a level shifting operation shown in FIG. 10 to be attained just as the mode of embodiment shown in FIG. 8.

The spherical aberration compensation value generator 63 is capable of attaining spherical aberration compensation not only by either one of an edge shifting (pulse width changing) operation and a level shifting (amplitude changing) operation but also by a combination of both thereof.

As described above, the present invention makes compensation for spherical aberration by controlling a pulse width or amplitude of recording data with respect to an optical recording medium on the basis of detected information on spherical aberration, and thereby lessens the deterioration of writing characteristics ascribed to spherical aberration, whereby excellent recording and reproducing characteristics are attained.

According to the present invention described above, the controlling of a laser recording waveform with respect to an optical recording medium on the basis of information on spherical aberration detected by a detecting device is done by a controller, whereby spherical aberration occurring due to an error of a thickness of a transparent layer can be corrected without obtaining a reproduction signal. This enables excellent recording and reproducing characteristics to be attained.

Moreover, on the basis of an absolute value of detected information on spherical aberration,output from the spherical aberration compensation value generator through the absolute value convertor, either one or both of a pulse width and amplitude of recording data with respect to an optical recording medium are rendered variable. This enables the deterioration of the writing characteristics due to spherical aberration to be lessened, and excellent recording and reproducing characteristics to be attained. Rendering variable a pulse width for the application of write power by changing an edge shifting value in accordance with a spherical aberration error enables spherical aberration occurring due to an error of a thickness of a transparent layer to be corrected. Regarding a rate of controlling a current supplied to the write current source, a control voltage for a variable gain amplifier is controlled by a spherical aberration value, or the amplitude of a pulse obtained by adding an value corresponding to spherical aberration to a fixed current control rate and supplied to the pulse current source is rendered variable. This enables the spherical aberration occurring due to an error of a thickness of a transparent layer to be corrected, and excellent recording and reproducing characteristics to be attained.

According to the present invention, spherical aberration becomes large when NA is increased, and a noticeable effect is obtained, so that employing the present invention for the recording of information on a densified optical disk is effective.

What is claimed is:

1. An apparatus for recording information on an optical recording medium in which a recording surface is covered with a transparent layer, comprising:

means for converting recording information to be written on the optical recording medium into a pulse signal, detecting means for detecting spherical aberration occurring due to an error of a thickness of the transparent layer, and control means for controlling said pulse signal on the basis of the detected spherical aberration by said detecting means.

2. An optical recording apparatus according to claim 1, wherein said control means includes:

converting means for converting a relative value of spherical aberration obtained through said detecting means into an absolute value thereof, and generating means for generating a spherical aberration compensation value so that either one or both of the width and amplitude of the pulse signal are changed on the basis of the absolute value.

3. An optical recording apparatus according to claim 2, wherein a write pattern is recorded by pulse-modulating laser power, which is used during a recording operation, in the direction of a time axis by controlling the write current source, said generating means controls a pulse width of the write pattern control signal by inserting a delay circuit between write pattern generating means which generates the write pattern and said write current source, said delay circuit changing the pulse width of the pulse signal by a delay period corresponding to the absolute value of the detected spherical aberration.

4. An optical recording apparatus according to claim 3, wherein the generating means sets a delay period for said delay circuit to the highest level of time within a range of delay which the apparatus allows, when spherical aberration of a zero level is detected by said detecting means.

5. An optical recording apparatus according to claim 2, wherein the apparatus is adapted to record a write pattern by pulse-modulating laser power, which is used during a recording operation, in the direction of a time axis by controlling the write current source, and said generating means uses a variable gain amplifier which determines gain by a control voltage, for a current controller for determining a current control level of controlling a current supplied to said write current source, and controls a gain control voltage of said variable gain amplifier in accordance with the absolute value of spherical aberration to control the current control level.

6. An optical recording apparatus according to claim 2, wherein the apparatus is adapted to record a write pattern by pulse-modulating laser power, which is used during a recording operation, in the direction of a time axis by controlling a write current source, and said generating means uses an addition circuit for a current controller for determining a current control level of controlling a current supplied to the write current source, and determines the current control level by adding an absolute value corresponding to spherical aberration to a fixed value.

\* \* \* \* \*